(12) United States Patent
Kolodner et al.

(10) Patent No.: US 6,490,599 B2
(45) Date of Patent: Dec. 3, 2002

(54) ON-THE-FLY GARBAGE COLLECTOR (75) Inventors: Elliot K. Kolodner, Haifa (IL); Erez Petrank, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/733,085

(22) Filed: Dec. 11, 2000

(65) Prior Publication Data

US 2001/0000821 A1 May 3, 2001

Related U.S. Application Data

(62) Division of application No. 09/167,547, filed on Oct. 7, 1998, now Pat. No. 6,317,756.

(51) Int. Cl.$^7$ ............................................. G06F 17/30
(52) U.S. Cl. .................. 707/206; 711/153; 711/173
(58) Field of Search .................. 707/206; 711/147–173

(56) References Cited

U.S. PATENT DOCUMENTS

| | | | | |
|---|---|---|---|---|
| 5,857,210 | A | | 1/1999 | Tremblay .................. 707/206 |
| 5,873,105 | A | | 2/1999 | Tremblay .................. 707/206 |
| 5,900,001 | A | * | 5/1999 | Wolczko et al. ............ 707/206 |
| 5,903,900 | A | * | 5/1999 | Knippel et al. ............. 707/206 |
| 6,049,810 | A | * | 4/2000 | Schwartz et al. ........... 707/206 |
| 6,098,089 | A | * | 8/2000 | O'Connor et al. .......... 709/104 |
| 6,173,294 | B1 | * | 1/2001 | Azagury et al. ............ 707/206 |
| 6,199,075 | B1 | * | 3/2001 | Ungar et al. ............... 707/206 |
| 6,247,027 | B1 | * | 6/2001 | Chaudhry et al. .......... 707/206 |
| 6,249,793 | B1 | * | 6/2001 | Printezis et al. ............ 707/206 |
| 6,289,360 | B1 | * | 9/2001 | Kolodner et al. ........... 707/206 |

OTHER PUBLICATIONS

Ben–Ari, M.; "On–the–Fly Garbage Collection: New Algorithms Inspired by Program Proofs"; Automata, Languages and Programming; 9th Colloquim, pp. 14–22, Jul. 12–16, 1982.

Ben–Ari, M.; Algorithms for On–the–Fly Garbage Collection; ACM Transactions on Programming Languages and Systems; 6(3):333–344, Jul. 1984.

Demers, A. et al; "Combining Generational and Conservative Garbage Collection: Framework and Implementations," In Conf. Rec. of 17$^{th}$ annual ACM Symposium, ACM Notices, Jan. 1990, pp. 261–269.

Dijkstra, E. et al; "On the Fly Garbage Collection: An Exercise in Cooperation"; Lecture Notes in Comp. Sciences, No. 46, 1976.

Dijkstra, E. et al; "On the Fly Garbage Collection: An Exercise in Cooperation"; Comm. of ACM, 21(11):965–975, Nov. 1978.

Doligez, D. et al; "Portable, Unobtrusive Garbage Collection for Multiprocessor Systems"; In Conf. Rec. of 21$^{st}$ Annual ACM Symp., ACM Sigplan Notices, ACM Press, 1994, pp. 113–123.

(List continued on next page.)

Primary Examiner—Maria N. Von Buhr
(74) Attorney, Agent, or Firm—Browdy and Neimark, P.L.L.C.

(57) ABSTRACT

A method for performing garbage collection of memory objects in a memory heap, the method includes the steps of partitioning the heap into old and new generations. There follows the step of applying an on-the-fly garbage collection to memory objects in the young generation, whilst running simultaneously a program thread.

14 Claims, 4 Drawing Sheets

OTHER PUBLICATIONS

Doligez, D. et al; "A Concurrent Generational Garbage Collector for a Multi–Threaded Implementation of ML"; In Conf. Rec. of 20th Annual ACM Symp., ACM SIGPLAN Notices, ACM Press, 1993.

Gries, D.; "An Exercise in Proving Parallel Programs Correct"; Communications of the ACM; 20(12):921–930, Dec. 1977.

Hudak, P. et al., "Garbage Collection and Task Deletion in Distributed Systems"; ACM Symp. on Lisp and Functional Programming, pp. 168–178, Aug. 1982.

Jones, R.E. et al; "Garbage Collection: Algorithms for Automatic Dynamic Memory Management"; Chapters 7 and 8, 1996.

Kung, H.T. et al, "An Efficient Parallel Garbage Collection System and Its Correctness Proof"; IEEE Symp. on Foundations of Computer Science, pp. 120–131, IEEE Press, 1977.

Lamport, L., "Garbage Collection with Multiple Processes: An Exercise in Parallelism"; Proc. of the 1976 Inter. Conf. on Parallel Processing, pp. 50–54, 1976.

Lieberman, H. et al; "A Real Time Garbage Collecter Based on the Lifetime of Objects"; Comm. in the ACM, 26(6), pp. 419–429, No Date.

Steele, Jr. G.; "Multiprocessing Compactifying Garbage Collection"; Comm. of the ACM, 18(9):495–508, Sep. 1975.

Steele,.G.; "Corrigendum: Multiprocessing Compactifying Garbage Collection"; Comm. of the ACM, 19(6):354, Jun. 1976.

\* cited by examiner

ON-THE-FLY GARBAGE COLLECTOR

This is a division of parent application Ser. No. 09/167,547, filed Oct. 7, 1998. now U.S. Pat. No. 6,317,756.

FIELD OF THE INVENTION

The present invention is in the general field of memory management and concerns more specifically garbage collection (GC) for computer languages and computer systems.

LIST OF REFERENCES

1. Mordechai Ben-Ari. On-the-fly garbage collection: New algorithms inspired by program proofs. In M. Nielsen and E. M. Schmidt, editors, *Automata, languages and programming*. Ninth colloquium (Aarhus,Denmark) pages 14–22, New York, Jul. 12–16, 1982. Springer-Verlag.
2. Mordechai Ben-Ari. Algorithms for on-the-fly garbage collection. *ACM Transactions on Programming Languages and Systems*, 6(3):333–344, July 1984.
3. Alan Demers, Mark Weiser, Barry Hayes, Daniel G. Bobrow, and Scott Shenker. Combining generational and conservative garbage collection: Framework and implementations. in Conference Record of the *Seventeenth Annual ACM Symposium on Principles of Programming Languages*, ACM SIGPLAN Notices, January 1990. ACM Press,pages 261–269.
4. Edsgar W. Dijkstra, Leslie Lamport, A. J. Martin, C. S. Scholten and E. F. M. Steffens. On-the-fly garbage collection: An exercise in cooperation. In *Lecture Notes in Computer Science*, No. 46, Springer-Verlag, New York, 1976.
5. Edsgar W. Dijkstra, Leslie Lamport, A. J. Martin, C. S. Scholten and E. F. M. Steffens. On-the-fly garbage collection: An exercise in cooperation. *Communications of the ACM*, 21 (11): 965–975, November 1978.
6. D. Doligez and G. Gonthier. Portable, unobtrusive garbage collection for multiprocessor systems. In Conference Record of the Twenty-first Annual ACM *Symposium on Principles of Programming Languages*, ACM SIGPLAN Notices. ACM Press, 1994, pages 113–123.
7. D. Doligez and X. Leroy. A concurrent generational garbage collector for a multi-threaded implementation of ML. In Conference Record of the *Twentieth Annual ACM Symposium on Principles of Programming Languages*, ACM SIGPLAN Notices. ACM Press, January 1993.
8. David Gries.
   An exercise in proving parallel programs correct. *Communications of the ACM*, 20(12):921–930, December 1977.
9. P. Hudak, R. M. Keller. Garbage Collection and Task Deletion in Distributed Systems. In *ACM Symposium on Lisp and Functional Programming*, pp. 168–178, Pittsburgh, Pa. August 1982.
10. R. E. Jones and R. D. Lins. Garbage Collection: Algorithms for Automatic Dynamic Memory Management. John Wiley \& Sons, July 1996.
11. H. T. Kung and S. W. Song. An efficient parallel garbage collection system and its correctness proof. In *IEEE Symposium on Foundations of Computer Science*, pages 120–131. IEEE Press, 1977.
12. L. Lamport. Garbage collection with multiple processes: an exercise in parallelism. In *Proceedings of the 1976 International Conference on Parallel Processing*, pages 50–54, 1976.
13. H. Lieberman and C. E. Hewitt. A Real Time Garbage Collector Based on the Lifetimes of Objects. *Communications of the ACM*, 26(6), pages 419–429, 1983.
14. Guy L. Steele. Multiprocessing compactifying garbage collection. *Communications of the ACM*, 18(9):495–508, September 1975.
15. Guy L. Steele. Corrigendum: Multiprocessing compactifying garbage collection. *Communications of the ACM*, 19(6):354, June 1976.

BACKGROUND OF THE INVENTION

Garbage collectors free the space held by unreachable (dead) objects so that this space can be reused in future allocations.

An on-the-fly garbage collector, i.e., a collector that reclaims unused space in parallel to the running program without stopping it for the collection is a fascinating theoretical idea with important benefits in practice. In particular, in many server platforms the actual operation of stopping all parallel threads in order to do a garbage collection task is a high cost time consuming operation. The reason is that the threads cannot be stopped at any point and thus there is a relatively long wait until the last (of many) threads reaches a point where it may stop.

The study of on-the-fly garbage collectors was initiated by Steeles and Dijkstra et. al. [14, 15, 4] and was continued in a series of many papers (see for example [5,8,1,2,11 and 12] culminating in the Doligez-Gonthier-Leroy (DGL) collector [6,7].

The specified collectors are of the so called mark and sweep collector type. In these type of collectors, there is normally a first step, in which the live objects in the heap are marked and there is a second step in which the unmarked objects are "swept", i.e., reclaimed for future use.

The trace of live objects is done with a 3-color scheme: Objects are white if they have not been traced, they are marked gray if they have been traced but their immediate children have not been traced yet, and they are marked black if they have been traced and their immediate children have been traced as well. The trace proceeds step by step by taking a gray object, marking it black and marking gray all its white children.

Figure 1:
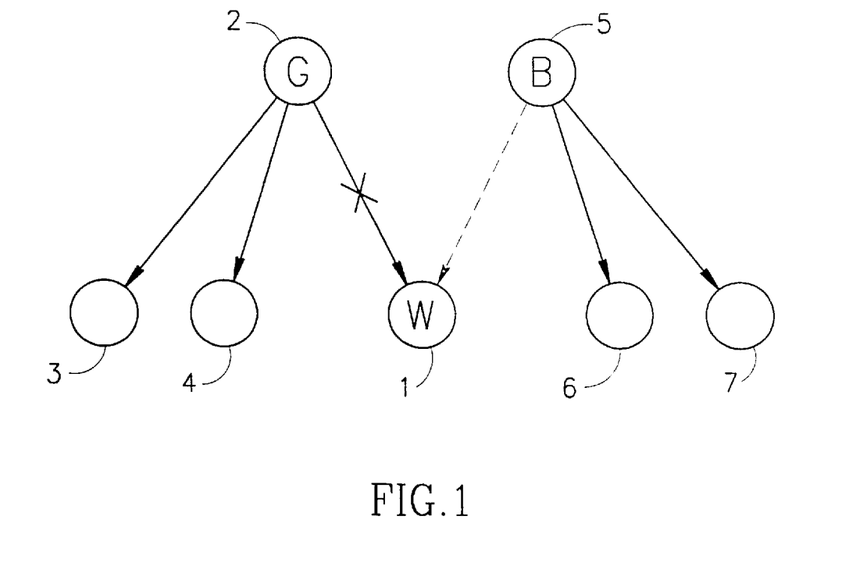
FIG. 1 is a schematic illustration of objects in a heap, which serves for explaining concepts of on-the-fly collector according to the prior art.

The fact that the collector works "on-the-fly" makes its life harder. Thus, while it is scanning the heap, the reachability graph is changed by the user program concurrently. If the collector uses this naive search, it may miss some live items. If, for example, (see FIG. 1) the user program moves a white node (1) from being reference by a gray object (2) (i.e., whose children (3 and 4) have not yet been traced) to being referenced by a black object (5) (whose sons (6, 7) will not be traced any more), then the white object (1) (and its sons, if any) may not be traced.

To solve this problem and let the collector spot all live objects during the trace, the program threads help the collector through a write barrier. During the time that the collector performs the tracing of the heap, whenever a pointer is modified from pointing to an object A into pointing to object B, either A or B are marked gray by the modifier thread (by the embodiment of FIG. 1 object (1) is marked gray either when the connection to (5) is created or when reference from (2) is erased). Choosing which of the objects to mark is up to the specific algorithm. In some algorithms both A and B may be marked gray. This operation of the program is sometimes called the "write barrier" or the "update protocol".

Another issue is how to color newly allocated objects during the collection. A solution to the latter problem is sometimes called the "create protocol".

The specific details of an on-the-fly algorithm are well documented in the literature and therefore will not be expounded upon herein.

Turning now to generational garbage collection, the idea was introduced by Lieberman and Hewitt [13]. Generational garbage collectors rely on the assumption that many objects die young. The heap is partitioned into two parts: the young generation and the old generation. New objects are allocated in the young generation which is collected frequently. (See FIG. 2)

Young objects that survive several collections are "promoted" to the older generation. Since the young generation is kept small, most collections are fast and do not stall the application for too long, giving rise to the following advantages:

1. Most collections are fast and efficient: they concentrate on the young part where a high percentage of garbage is normally found.
2. The young generation is frequently collected and therefore can be frequently reused.
3. The collector uses a smaller working set since most collections only scan a small part of the young generation.
4. The specified advantages give rise to an overall system behavior with less paging: the collector traces through less pages and the program keeps a small working set since the heap is reused.

Traditionally, generational collections partition the heap into the generations in a physical sense. Namely, to promote an. object from the young generation to the old generation, the object has to be moved from the young part of the heap to the old part of the heap. Reverting for a moment to on-the-fly collectors it is not recommended to move objects in the heap (by the collector) concurrently with the run of the program since a given object may be used by the program whilst being removed by the collector bringing about obvious undesired results. Whilst the moving object conflict may be resolved by utilizing known per se synchronization primitives, the latter pose an undue overhead on the overall performance of the program/collector.

There follows a brief description of a known per se generational collector that does not move the objects in the heap.

As will be explained below, the latter concept is used by the system and method of the invention. It should be noted, however, that the invention is by no means bound by this particular example.

Thus, Demers et. al. [3] presented a generational collector that does not move the objects in the heap (hereinafter mark and sweep). Their motivation was to allow generational collection when a conservative collection is required.

There follows a brief review of the specified non-moving generational collection technique. The description is focused in a version of the algorithm which is defined in the paper as "the sticky bits". At first the algorithm is described and then the issue of why it constitutes a generational collector is addessed. The description focuses on a "stop the world" collector, i.e., it is assumed that when the collector is run, the program threads (mutators) are stopped. (Of course, in the system and method of the invention the latter stipulation does not apply). It should be noted that the description bellow does not follow Demers exactly. Thus, terminology and concepts that are not mentioned in Demers and yet are useful for understanding the underlying concept of the invention, e.g. "colors" is used.

Figure 2:
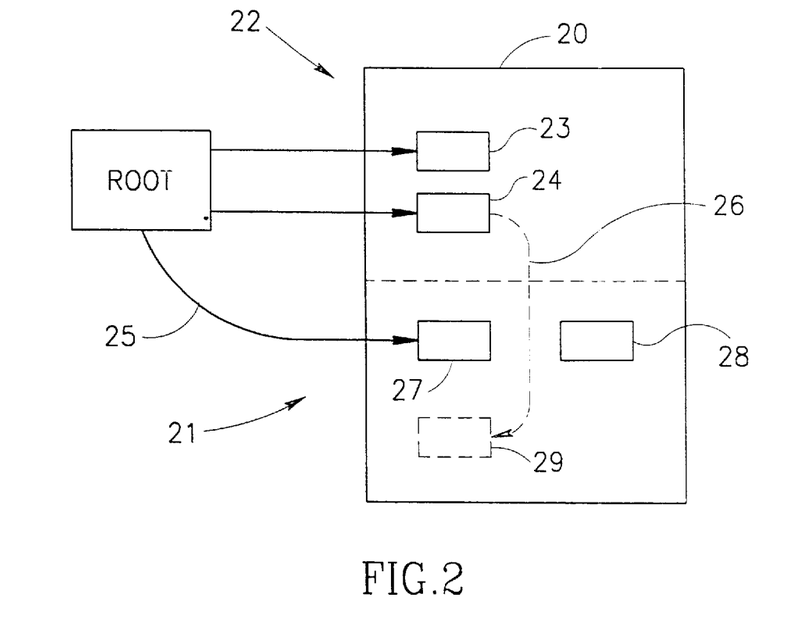
FIG. 2 is a generalized schematic illustration of a heap partitioned to generations, according to the prior art.

For a better understanding of the foregoing attention is now directed to FIG. 2 showing a generalized schematic illustration of a heap partitioned to generations. It is assume that, at first stage, memory object (29) and pointer (26) (marked in dashed lines) do not exist and accordingly the heap consists of only objects (23, 24, 27 and 28) Thus, in a mark and sweep algorithm, the collector starts with all allocated objects being white,((23), (24), (27) and (28)), and during the "mark" stage, it marks in black all objects that are reachable from the roots by a path of pointers. (In FIG. 2: (23), (24) and (27)).

First, all objects that are referenced by the stack and registers (the roots) are grayed. Then, all live objects are traced in the following way:

if there is a gray object A, then A gets black color, and for any white object B referenced by A, B gets gray color. The latter series of steps constitute a first form of tracing which continues until there are no more gray objects. All live objects are-then black and garbage objects are white. In the embodiment of FIG. 2, only object (28) is white upon completion of the algorithm After the mark phase is completed and all live objects are colored black, the sweep phase reclaims white objects and re-colors black objects white in preparation for the next garbage collection cycle. This collection which starts with all objects white, marks all live objects, and reclaims all unmarked objects, is called full collection, since all the heap is collected.

In the method of [3], a so-called partial collection is also allowed. Thus, at the end of each collection (while sweeping), black objects are left black and accordingly at the start of the next partial collection many of the live objects in the heap are black. (This is the reason for the name of the method: the bits that mark the object black stick to it, that is, they are not cleared at sweep time.) By the particular example of FIG. 2, objects (23), (24) and (27) remain black.

During the normal operation time, the program threads (also called mutators), record all pointer modifications. To do that, the heap is partitioned into cards, and each card has an associated dirty-bit indicating whether this card was modified since the last collection. A detailed discussion of the known per se card marking can be found in [10]. When a mutator modifies a pointer, (e.g. pointer (26) is added from object (27) to a new object, (29), it marks the card to which the pointer belongs as "dirty" (recording updates is not needed for a full collection).

Thus, all pointers (by this example (26)) that were modified between the collection are on dirty cards. Alternatively, it is possible to keep a dirty bit per object and mark each object as being dirty or not, i.e. mark object (24) as dirty.

A partial collection operates, typically, as follows:

Marking starts with the regular roots marking plus a marking of all white objects referenced from black objects on dirty cards.

In the case that a dirty bit is kept for each object, then all the objects that are referenced by dirty black objects are marked gray. By the specific example of FIG. 2, the marking starts from the root and from the black object (24), which has its dirty bit set. All dirty bits are then cleared.

After this initial marking, a standard tracing is executed: for each object marked gray in the manner specified, mark it black and all its' white descendants gray. This implies that the tracing does not go through black (marked) objects. Namely, when a black object with its dirty bit reset is encountered, its descendants are not traced.

By the embodiment of FIG. 2, if objects (23) and (27) had descendants, the latter would not have been traced since their respective dirty bits are reset. In contrast, object (24) is traced (due to the fact that its dirty bit is set), and therefore, its son (29) is traced and subject to color change (from white through gray to black) in the manner specified.

After tracing, the heap is swept, i.e., all white objects are reclaimed. The marked objects are either unmarked for a next full collection, or remain marked for another partial collection.

Accordingly, it should be noted that in partial collection, despite the fact that black objects are not traced, the dirty bit assumes that "black objects" will be nevertheless, traced, and their descendant duly treated, i.e. assigned with the appropriate color. The net effect is that despite the partial collection, no living object is mistakenly reclaimed.

There follows now brief description for clarifying why the specified algorithm constitutes a generational collector.

In order to explain that, one should think of the black objects as being in the old generation and the white objects as being in the young generation. The part of the heap that is touched during the mark stage contains exactly the objects in the young generation plus the objects in the old generation required to mark inter-generational pointers.

The young generation here contains all objects that were created after the last collection.

Note that all objects that survived the last collection must be black. Thus, the objects in the old generation are not traced.

Objects that are candidates for holding inter-generational pointers are traced. Similar to "regular" generational collection, all modified objects (or all objects on modified cards) must be scanned in order to find all inter-generational pointers (pointing from the old generation to the young generation). Thus, all marked objects on all dirty cards are scanned and inter-generational pointers are marked: i.e. pointers that point from old objects on dirty cards into the young generation. In the present case, these are dirty black objects. Finally, as always, tracing does not trace through the old generation since black objects are not traversed.

There is accordingly a need in the art to incorporate generations into on-the-fly collector so as to obtain a generational on-the-fly garbage collector which benefits from the advantages (as discussed above) of both conventional generational garbage collector and on-the fly collector.

SUMMARY OF THE INVENTION

According to the invention there is provided for the first time a generational on-the-fly collector. There is thus provided in accordance with the invention a method for performing garbage collection of memory objects in a memory heap, the method comprising the steps of:

(a) partitioning said heap or portion thereof into at least two generations; and (b) applying substantiality on-the-fly garbage collection to memory objects in at least one from among said generations, whilst running at least one program thread.

In accordance with an aspect of the invention and as will be explained in greater detail below, the inter-generational value (e.g. dirty bit value) and identifier value (e.g. color value) associated with memory objects are manipulated so as to avoid races, e.g. by utilizing synchronization primitives or utilizing separated data structures for atomic write units.

In accordance with another aspect of the invention there is provided a technique for avoiding premature promotion, i.e. to keep for slightly longer the so created memory object in the young generation before they are promoted to older generation. As will be explained below, this is achieved by defining another unique color which is associated to newly created memory objects and which indicates that the specified memory object should not be reclaimed or promoted to older generation in this cycle of collection.

Accordingly, by this aspect, the invention provides for a method of the kind specified, wherein the manipulating step further utilizing a unique identifier value for avoiding premature promotion of memory objects from a young generation to an older generation from among said at least two generations.

As will be explained in greater detail below, the utilization of a unique color in the manner specified may result in a race which may adversely affect the correctness of the proposed scheme. In order to avoid the specified undesired race, a so-called color toggling technique is utilized.

In accordance with another aspect of the invention, there is provided an ongoing technique which enables to delay the promotion of objects to older generations for predetermined time duration, e.g. in collection cycles (n being parameter).

The invention further provides for a computer system that includes memory for performing garbage collection of memory objects in a memory heap, the heap or portion thereof is partitioned into at least two generations; the system comprising:

at least one program thread running in said computer system;

a garbage collector for applying substantiality on-the-fly garbage collection to memory objects in at least one from among said generations, whilst running at least one of said program threads.

Still further, the invention provides for a computer system having a memory that includes data representative of memory objects in a memory heap; the memory heap or portion thereof is partitioned into at least two generations; the memory objects in at least one of said generations sustain after applying the specified garbage collection step.

The invention further provides for a computer system having a memory that includes data representative of memory objects in a memory heap; the memory heap or portion thereof is partitioned into at least two generations; said memory objects are associated with inter-generational values and identifier values for accomplishing garbage collection.

BRIEF DESCRIPTION OF THE DRAWINGS

For a better understanding, the invention will now be described by way of example only, with reference to the accompanying drawings, in which.

DESCRIPTION OF SPECIFIC EMBODIMENTS

Before turning to the description of the method steps of the invention, there follow some general observations in connection with two issues, i.e. how to manipulate correctly inter-generational (e.g. dirty bit) and color values associated with memory objects. It should be noted that the invention is by no means bound to any particular type or size of memory object. Moreover, reference to "colors" is made for convenience of explanation only, and accordingly when reference is made for example to "white" color and "black" color it should be construed as encompassing any kind of first and second identifier values. Identifier values may be represented of course not necessarily in terms of colors.

The present invention preferably utilizes a generational garbage collection scheme being a derivative of the one disclosed e.g. in Demers et al. [3]. Those versed in the art will, however, readily appreciate that the invention is by no means bound by the specific generational garbage collection scheme according to Demers et al. Moreover, the invention is applicable with any generational garbage collection application which exploits substantially non-moving objects.

In the context of the invention reference is occasionally made to the act of partitioning the heap into generations. It should be noted that the partition of the heap to generations is not meant in the physical context as appearing e.g. in FIG. 2. The partition should be construed in the logical sense according to the age of the objects, e.g. their creation time. (Thus, the same physical "area" of the heap may contain memory objects that belong to different generations.

It should be further noted that in the context of the invention reference and pointer are used interchangeably.

It should be noted that whilst threads and processes are distinguished one with respect to the other, in the context of the invention both processes and threads are applicable and therefore are used interchangeably. The invention is not limited by any specific platform(s) that is (are) running the process(es) or thread(s).

The term "object", or "memory object" used herein is by no means bound to memory objects in the sense used in object orienting programming. Thus, in the context of the invention "object" (or "memory object") should be construed as an entity in the memory that is allocated and freed as a single unit.

Any reference to identifier value, inter-generational value, age value etc. that is (are) associated with memory objects is not bound to any specific realization and accordingly, any known per se data structure that is utilized to this end is applicable according to the present invention.

Turning, at first, to dirty bits (being one realization of inter-generational value indicating the possible existence of inter-generational pointer), it should be decided how to associate dirty bits with objects.

Thus, a dirty bit is used to indicate a possibility of inter-generational pointers. The program threads set the dirty bit whenever a pointer modification is performed (e.g. pointer (26) in FIG. 2). As explained above, the dirty bit can be associated either with a card (for detailed discussion of the utilizing of a card marking, reference is made to [10] which includes several objects, or a dirty bit may be associated with a single object.

According to another option a two-level scheme is used: a dirty bit for each card that contains a dirty object and in addition one dirty bit per object. The latter technique requires more time from the user program while it's marking an object dirty, since it has to mark both the dirty bit of the card and also the dirty bit of the specific object. However, it saves time for the collector, since the collector can tell exactly which object in a dirty card is actually dirty and does not have to trace all objects in the card. Those versed in the art will readily appreciate that the invention is by no means bound by the above three options for associating inter-generational value (and by this particular embodiment a dirty bit) to memory objects.

Figure 3:
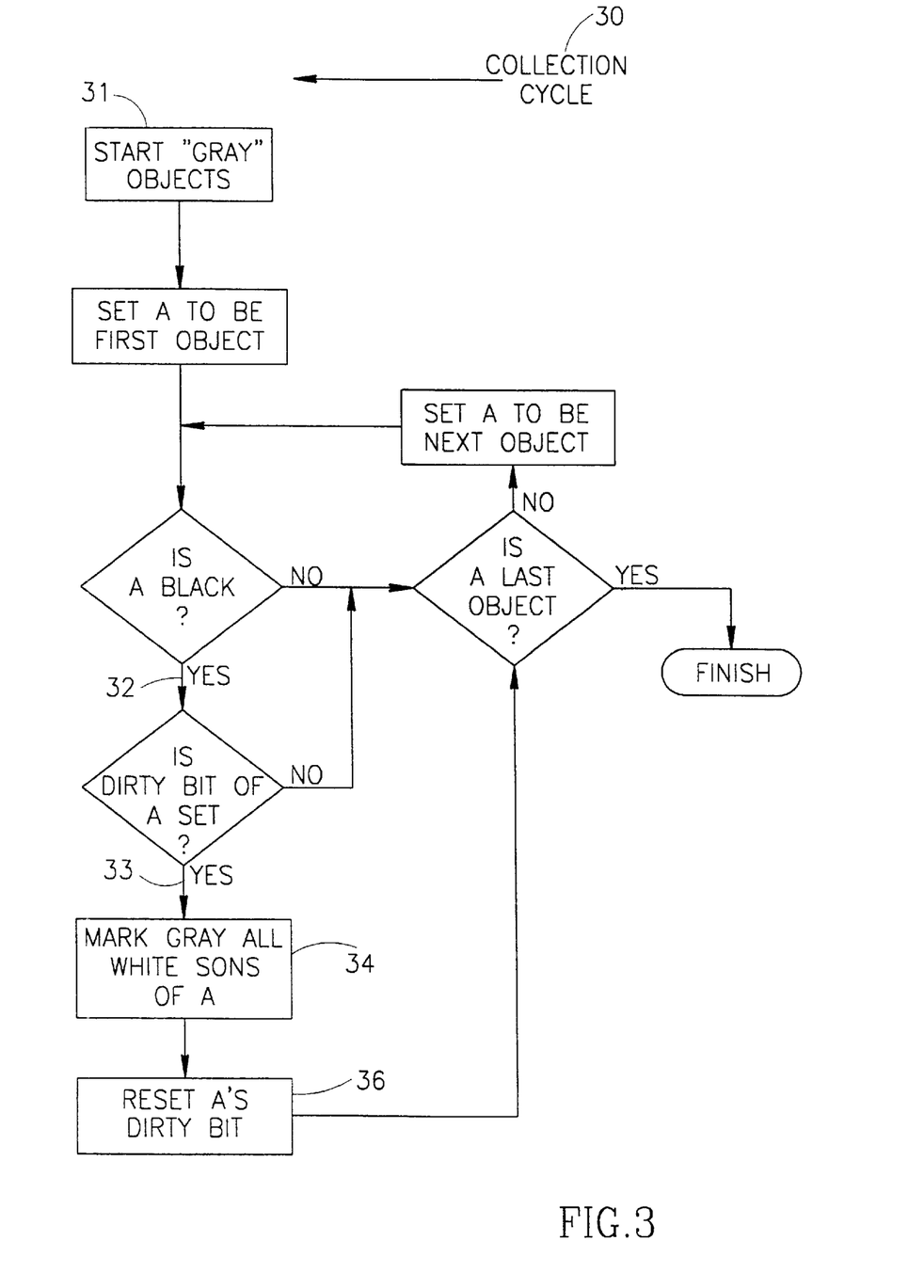
FIG. 3 illustrates a generalized block diagram of the operational steps of a program thread and an on-the-fly collector, according to one embodiment of the invention.

Having explained how to associate a dirty bit to a memory object, there follows a description of the steps of the invention according to one embodiment of the invention with reference to FIG. 3.
1. In the beginning of the collection cycle (30), after the program has been "told" to start marking gray when modifying a pointer (i.e. reference modification), (31) the collector manipulates the dirty bits in the following way:
2. For any object A whose color is black and whose dirty bit is set (32, 33):
   (a) Any object B that is referenced by A and whose color is white, is marked gray (34). (These references from all such A's to all such B's are candidates for being inter-generational pointers.)
   (b) After graying all white objects referenced by A, the collector resets the dirty bit of A (36).

The notification by the collector to the program threads that there is a need to gray when updating may be implemented in different manner in various embodiments, provided that the program threads be graying when the above procedure is executed.

The utilization of colors and dirty bits by (separate) generational collectors and on-the-fly collector has been discussed in the "Background of the invention" section above and will not be further expounded herein.

It should be noted that in the context of the invention, on-the-fly collection includes an inherent tracing step. Typical, yet not exclusive, example being the specified first form of tracing referred to in the "Background of the Invention" section above.

The remaining issues of how to manipulate simultaneously colors and dirty bits in order to avoid races and in particular: (a)dirty bit/color race, (b)collector-thread "color" race, and (c)collector/thread "dirty bit" race will be discussed below. The importance of the ordering of the specified steps 2(a) and 2(b) will be also discussed.

In a hitherto known stop-the-world collector there is no problem: the program threads mark the dirty bit, but there is no race with the collector who works independently on the marking information while the program stops. However, in an on-the-fly collector, the program threads may be marking the dirty bit concurrently with other threads changing the color of the object and concurrently with the collector manipulating both the colors and the dirty bit.

Consider, for example, a color/dirty bit data structure (see FIG. 4A) that is associated with a memory object, e.g. byte (40). The specified data structure is an atomic write unit, i.e. it is not possible to write to a portion of said unit leaving the remaining portion intact.

Figure 4A:
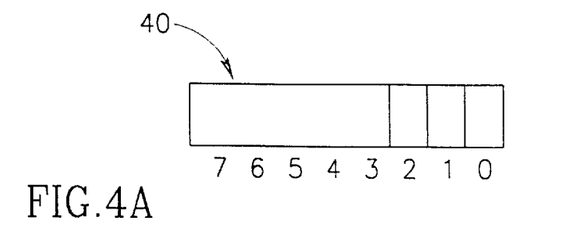
FIGS. 4A–B are two schematic illustrations which serve for clarifying the operational steps of the embodiment shown in FIG. 3.
Figure 4B:
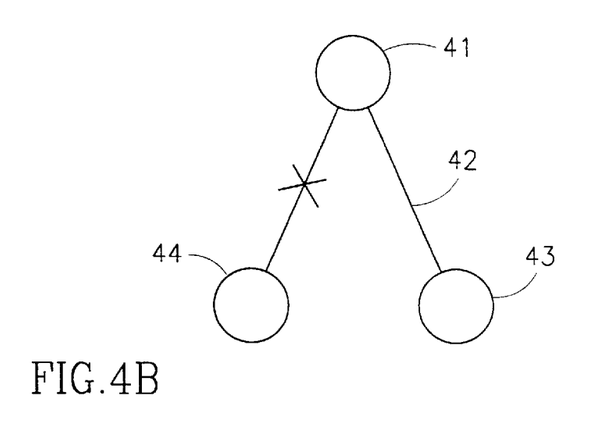

Now, the first bit (offset 0) in byte (40) signifies the dirty bit (i.e. '0' stands for dirty bit reset and '1' stands for dirty bit set); the next two bits (offsets 1 and 2) stand for the color ('00' stands for white, '01' stands for gray, and '10' stands for black). Consider now that the current value of the byte associated with a memory object (41 in FIG. 4B) is xxxxx010, (dirty bit reset; color gray). Suppose now that the program thread modifies a pointer originating from object (41), i.e. pointer (42). Since the latter may constitute an inter-generational pointer it is required to set the dirty bit of memory object B (41). To this end, the program thread reads the contents of byte (40) and modifies the contents of the dirty bit to '1'. Before the program manages to write the byte back to data structure (40), the on-the-fly collector, operating simultaneously to the specified thread (and being "unaware" to the new reference from object (41) to (43)), "grays" object (44) and since object (44) is the only son of object (41) (from the standpoint of the collector), it modifies the color of object (40) to black, i.e. the value for writing is xxxxx100 and resets the dirty bit. Now, the program thread intends to write the value xxxxx011 and the collector intend to write xxxxx100. Since the correct value should be xxxxx101 (color black, dirty bit set), an erroneous value will be written regardless of who (i.e. collector or thread) wins in the race. It is obviously desired to avoid this ill conceived scenario.

One possible approach for correctly manipulating dirty bits and colors is to use an appropriate synchronization (such as a "compare and swap" operation)each time a dirty bit and/or a color is modified.

This synchronization is enough to ensure that the generational collection works correctly. However, a synchronized operation is expensive, and it is particularly harmful in this case since the setting of the dirty bit must be extremely efficient: it is executed for each pointer update by the program (during a collection cycle).

According to a another embodiment, each dirty bit is kept in a separate atomic write unit, which is separate from the colors. Atomic write unit being e.g. a byte a word or any other unit depending upon the architecture of the processing platform or platforms running the program threads and the on-the-fly collector.

Having dealt with dirty bit—color race it is shown that no further synchronization is required for manipulating separately colors and the dirty bits.

Turning at first to dirty bits, it is recalled (see e.g. FIG. 1) that the program threads may only set the dirty bit and never reset it. Thus, the race between the program threads is not destructive. Race, therefore, may only occur when the program thread sets the dirty bit and the collector, running simultaneously, resets the same bit. The analysis of possible race between program thread and the collector is discussed below. The result of these concurrent operations is that only one of these operations (i.e. the collector or the program thread) "wins" in determining the value of the dirty bit. It is argued that this does not foil the correctness of the collector.

Suppose that indeed a program thread wants to set the dirty bit but fails since the collector resets it at the same time. The setting of the bit is meant to indicate a possible inter-generational pointers for the collector for the started collection cycle (see e.g. the setting of the dirty bit associated with object (5) in FIG. 1). Setting of the bit (in collection cycle) necessarily entails that from the specified object a pointer has been modified (constituting possibly an inter-generational pointer).

This information is irrelevant for future collections by virtue of the write barrier since the object referenced by the pointer is grayed and all live objects of the young generation are promoted (i.e. are marked black) during a collection (it is recalled that black color indicates promotion from young generation to older one). Thus, the specified pointer will not be an inter-generational pointer. It will reference an old object and the object with the reference need not be recorded as a candidate for holding inter-generational pointers.

On the other hand, suppose that the program wins and the collector's resetting the bit failed. This means that in the next collection an object (that was marked dirty during the previous collection cycle) is unnecessarily scanned. This may be less efficient, but does not harm the correctness. Lastly, it is important to note that inter-generational pointers may be constructed whilst performing the collection. Since inter-generational pointers are only checked in the beginning of the collection, one may think that a second check (for inter-generational pointer) is required later, but this is not the case. The latter second check is obviated since all live objects are going to become old and accordingly no pointer can become inter-generational (i.e. pointing from old to young) and therefore there is no risk of "missing" any live object during trace.

Having explained that there is no risk of collector/program thread race in respect of dirty bit, there follows a brief discussion which clarifies that colors are likewise handled correctly and there is no risk of race and accordingly, there no need for synchronization.

Thus, with respect to coloring, the program threads may only turn white to gray and only during the tracing stage of the collector. This is never contradicted by the collector since during the tracing stage the collector never turns gray to white. Actually, the only operation that the collector does with white objects is also turning them gray. Thus, the collector and the program threads do not contradict each other or foil each other's operation, and in particular, there is no problem with setting the color of objects. The colors are set independently and the correct operation with respect to the colors being manipulated concurrently is guaranteed by the correctness of the on-the-fly collector that is used.

It should be noted that in normal on-the-fly collection, objects are being created during the collection cycle. If these objects are created during the tracing of the collector, they are either created black or they become black before the sweep (unless they die immediately). Otherwise, the collector will reclaim them.

As explained above, objects having black color are interpreted as belonging to "old" generation. Thus, coloring a newly created object black means that actually the object is created in the old generation (or immediately promoted to old generation). By the same token, converting newly generated white objects (infants) to black promotes them from young to old generation. Creating objects in black or changing the color of infant white objects to black constitutes a so-called pre-mature promotion.

This pre-mature promotion is not desirable since it adversely effects performance of generational collection. These new objects may die quite young, but since they are created black (or changed from white to black), they will not be collected until the next full collection, despite the fact that they die young and could have been collected and reclaimed much earlier.

Coloring them white foils the correctness of the collection since these objects may be collected.

In order to cope with the premature promotion, it is suggested in accordance with another aspect of the invention (hereinafter e.g. pre-mature promotion aspect) to introduce a new color (yellow) for newly allocated objects. The color yellow has the following meaning: It's a black for tracing (and sweeping) purposes but it's not in the old generation. Note that yellow objects are treated as black objects during the collection: the children of such an object are not traced and the object cannot be marked gray.

There now arises the question of when to start and create yellow objects? The time is dictated by the time in which the dirty bits are checked and cleared by the collector. Once a yellow object is created, it will not be collected in this collection cycle and accordingly a solid record of all inter-generational pointers that may reference this object must be kept.

This record must be correct in the next collection cycle, and therefore the collector is not allowed to reset any of the dirty bits after any object is created yellow in the current cycle. Thus, objects may be created yellow after the collector is done with checking and clearing the dirty bits. To summarize, (see FIG. 3) after the following steps:

for any object A whose color is black and whose dirty bit is set (32, 33):

Any object B that is referenced by A and whose color is white, is marked gray (34). (These references from all such A's to all such B's are inter-generational pointers.)

After graying all white objects referenced by A, the collector resets the dirty bit of A (36).

There follows another step of start coloring new objects yellow.

When new objects are created during sweep (see FIG. 5), their color must be determined according to whether the sweep pointer has already passed them. This requires careful coordination between the sweep procedure and the creation procedure. This coordination is called the create protocol and involves solving a race between the create procedure and the sweep procedure.

Figure 5:
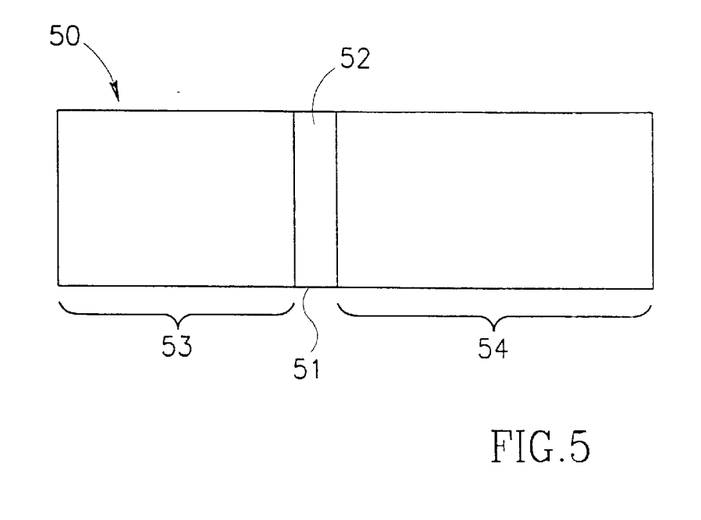
FIG. 5 is a schematic illustration of a heap structure in an exemplary collection cycle according to one embodiment of the invention.

During sweep, the heap (50) is scanned, white objects are reclaimed, black objects remain black and yellow objects should turn white. If the sweep pointer (51) points to object A (52), then all objects that are generated in the part of the heap that has already been scanned (53) should be white (thus, ready for the next cycle of collection). All the objects that are generated in the part that has not as yet been scanned should be yellow (and when subsequently scanned will be turned to white ready for the next cycle of collection—thereby coping with premature promotion). Considering now a third option i.e. the sweep pointer is pointing at an object A which is now being created. This is a race situation, i.e. which color should A get, yellow or white?

If it has not been swept yet, then white is not allowed, since it will be immediately reclaimed. However, if it is set to yellow and the sweep will not make it white, then the collection will also not work well since a yellow object should not appear in the beginning of the next collection. This problem is not unique to this collection scheme and techniques to cope with this problem have been suggested for distributed collectors by Hudak and Keller and for concurrent and on-the-fly collectors by Kolonder Lewis. Both methods build on Lamport's color toggling idea [12].

To solve the race problem and also avoid the actual turning of yellows into white (thus, increasing efficiency and achieving correctness), the Kolonder and Lewis idea of color toggling for on-the-fly collectors is utilized and modified for the settings of the invention.

Figure 6:
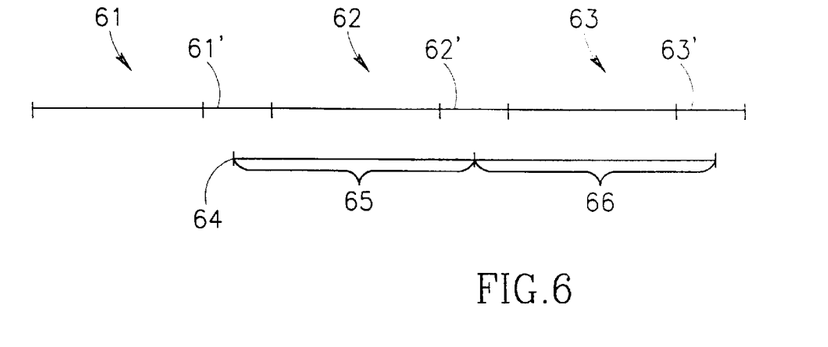
FIG. 6 is a chart illustrating a sequence of garbage collection cycles utilizing a color toggling.

For a better understanding of the foregoing, attention is directed to FIG. 6 which shows three consecutive collection cycles (61, 62 and 63), each including an active garbage collection (GC) cycle (61', 62' and 63', respectively).

When active collection commences, yellow objects are allocated. During sweep, all white objects are reclaimed, and thus, yellow objects are created until the next collection cycle, and there are no white objects at the beginning of the next active collection. It is recalled that yellow objects can be generated only after the dirty bit is reset, and therefore the starting period of generating yellow objects (64) is delayed as compared to the commencement of active GC cycle (61'). Yellow objects are generated through time interval (65), i.e. until the next active collection cycle (62').

Since there are no whites at the beginning the next active GC cycle (62'), the color white can now play the role that yellow played in previous collection. Thus, in the next active collection cycle (62') (after the dirty bit was reset) white objects are allocated, and all remaining yellows are collected. White objects are allocated through time interval (66) until the next active collection (63'), in which yellows are allocated and all whites are reclaimed, and so forth.

In one possible practical realization, a variable allocation_color is defined, which holds the color with which new objects are currently colored. Another variable called clear_color is a variable which holds the color of objects that should be collected during sweep. Initially, allocation_color is set to white and clear_color is set to yellow. In the beginning of each collection, after the dirty bits have been reset, the values of these two variables are toggled. Objects are now created with a new color and objects created with the previous color may be reclaimed. During sweep, it is no longer required to "turn yellows into white" neither worry about the race between the sweep pointer and the creation procedure. Objects are created with allocation_color color no matter where they are in the heap and no matter at what stage the collector is.

For accomplishing a full collection the colors of all objects should be turned into the allocation color and reset all dirty bits. This can be done instead of the normal clearing of the dirty bit at the start of each partial collection.

The advantage of the specified technique according to the first premature promotion aspect of the invention is that simple modification allows introducing generations into substantially any on-the-fly collector technique. The cost of this simplicity is that there is not much control on the parameters of the generations, i.e. there are normally only two generations and the aging of young objects (i.e. the mechanism that determines whether a young object becomes old) is primitive.

According to another aspect (hereinafter the aging aspect of the invention), there is provided an aging mechanism which enables to promote objects from a younger generation to an older generation after n collection cycles (n parameter). By one embodiment of the aging aspect, each object is associated with a so-called age value. The age value is set to 0 for a new object and is incremented in each collection. When the age reaches a predetermined number n, the object is considered tenured, i.e., residing in an older generation. As in the previous premature promotion aspect, an object's dirty bit is set by the program threads and can be reset if it turns out that all its children are in the old generation.

Here the color toggling is used as before.

Once aging mechanism is introduced in the manner specified, the program threads must raise the dirty bit at all times. Accordingly, race between setting the dirty bit (by the mutator) and the concurrent resetting of this bit (by the collector) cannot be handled in the simple manner of the previous premature promotion aspect of the invention. In the latter aspect, since all objects in the young generation were promoted, then raising the dirty bit during the collection could be skipped at certain parts of the collection.

In contrast, in the present aging aspect, some objects remain young for the next collection, and a proper record of any candidates for inter-generational pointer that reference them should be kept. This recording is needed for future collections.

Accordingly, the race between the setting of the dirty bit by the mutators and the resetting of this bit by the collector should be reconsidered.

Generally speaking, in order to reset the dirty bit, the collector will have to make a test (whether the bit can be erased) and then to actually reset of the bit. The mutator, on the other side of the race, has to do the actual update of a pointer and to set the dirty bit.

Consider the following problematic order of events:
1. The collector checks the pointers of Object A and finds out that there is no inter-generational pointer and thus, A's dirty bit can be reset.
2. The program thread writes an inter-generational pointer into A and sets the dirty bit.
3. The collector resets the dirty bit since its check from Step (1) allows this.

The outcome of this course of events is that an inter-generational pointer is now located in a non-dirty object (i.e. having its dirty bit reset). Thus, the next (partial) collection will fail to trace this pointer and may reclaim live objects.

Figure 7:
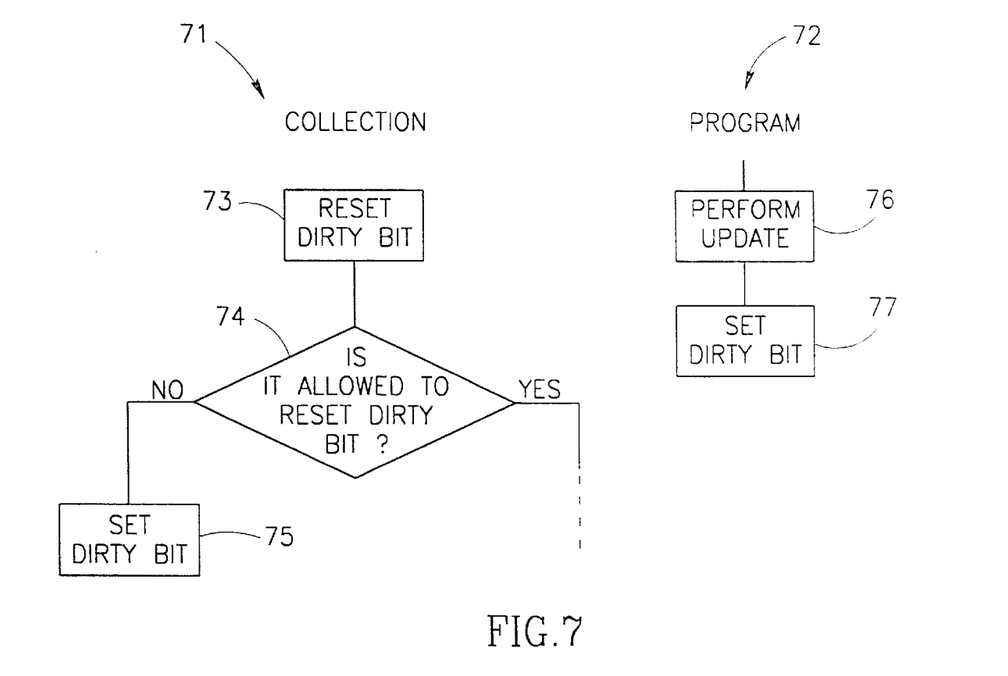
FIG. 7 illustrates an generalized block diagram of the operational steps of a program thread and an on-the-fly collector, according to another embodiment of the invention.

In order to solve this race the collector and mutator act as follows (see FIG. 7). For one, the collector (71) acts in three steps instead of the naive two steps.
1. First, it resets the dirty bit. (73)
2. Next, it checks whether the dirty bit can be reset,(74) and
3. if the answer in previous step was "no", it sets the dirty bit on again. (75) The mutator (72) uses the following two steps:
1. First, it does the actual update of a pointer (constituting a candidate inter-generational pointer), (76)
2. After step (1) it sets the dirty bit. (77)

It should be noted that the order of operation for both collector and program thread is crucial.

Having described the desired sequence of operation there follows analysis of the possible race. Suppose a mutator is updating a pointer in Object A making it an inter-generational pointer.

To make things sharp, it is assumed that before the update, the object did not contain other inter-generational pointers, and thus it is crucial to get the new update noticed. At the same time, the collector is checking whether the dirty bit of A can be reset and resets it if necessary (it is assumed that the memory is firmly consistent, i.e. order of execution of memory loads and stores is assured).

Accordingly, there are two possible cases to analyze:
Case 1: The mutator sets the dirty bit before the collector clears it: In this case, since the mutator sets the dirty bit (step 77) after doing the actual update (step 76), then collector must see the inter-generational pointer when it makes its check (step (74)) and it will set the dirty bit.
Case 2: The mutator sets the dirty bit after the collector cleared it: In this case, the dirty bit will remain set as required.

To sum up, if a new inter-generational pointer is created, then the dirty bit will be properly set and this pointer will be noticed by next collections.

Having explained how to maintain consistency of the dirty bit in the aging aspect of the invention, it still remains to be seen how to deal with possible race between the collector sweep routine and the program thread.

The situation here resembles the one described in with reference to FIG. 5 and in particular to the situation where the collector pointer (51) points to a memory object (52) being simultaneously allocated by the program thread.

There follows now a description that refers to the utilization of color toggling in connection with coping with the specified race in the aging aspect of the invention. Thus, in order to keep avoiding the race between the collector sweep routine and the mutators creating new objects Allocation_Color and clear_Color variables are toggled in the beginning of the collection (exactly as in the previous first premature promotion aspect of the invention). Also, during sweep, a black object which is young is turned into allocation_Color. An old black object remains black. By following this approach all the old generation is maintained black through all partial collections.

There follows now a short discussion as to one possible proposed data structure applicable for the aging aspect of the invention. Thus, in addition to the previous data structure (which includes e.g. color and dirty bit fields), each object must record information related to its age.

By this embodiment the required fields are:
The color of the object: there are four possible colors: white, gray, yellow and black;

Age: recording the age of the object. A reasonable size for the latter field would be 2–3 bits;
Dirty bit: is this object pointing to an object in the young generation.

As explained above, in order to save synchronization operations and time, the color and the dirty bit should reside in two different atomic write units, normally, two different bytes. By following this approach, the need to synchronize access to the two fields is obviated.

As is well known, in various architectures, the processor or processors are characterized in so called weak memory consistency, i.e. for a given order of load and store instructions A,B, it is not guaranteed that the order A,B will always be performed, and there may be cases where the actual order of executing the loads and store instructions would be B,A. This, of course, is not desired in all those embodiments of the invention, where the order of performing the steps is important for the correctness of the scheme.

The straightforward approach is by utilizing synchronization primitives to ensure correct order of execution (designated also as memory-coherence synchronization operation), but as explained before, this solution poses undue overhead on the overall performance of the collector program applications.

Accordingly, by another embodiment, a second dirty bit is added for each object. In the beginning of the collection cycle, the program threads get a notice to switch the dirty bit that is dirtied. For example, suppose that until the collection, all threads were using the second dirty bit, and now they are told to start using the first dirty bit. After all program threads perform a memory-coherence synchronization operation and acknowledge the change, the collector also performs a memory-coherence synchronization operation and it begins to test and reset the second dirty bits.

If the collector decides that a dirty bit should not be reset, then the collector sets it on in the currently used field. Namely, if the second dirty bit for object A is now set, and the collector decides that it should remain set, then the collector sets the first dirty bit of A, and resets the second dirty bit of A. Note that after the collector goes over all second dirty bits, all these bits become clear and are ready for use in the next collection cycle.

Also note that there is no race since the first dirty bit may only be set on by the collector and by the program thread, while the second dirty bit, which may be reset, is accessed by the collector only.

The proposed techniques of the invention in its various aspects, are all applicable e.g. for accomplishing garbage collection in JAVA.

The present invention has been described with a certain degree of particularity, but those versed in the art will readily appreciate that various alterations and modifications may be carried out without departing from the spirit and scope of the following claims.

What is claimed is:

1. A method for performing garbage collection of memory objects in a memory heap, the method comprising the steps of:
   (a) partitioning said heap or portion thereof into at least two generations; and
   (b) applying substantially on-the-fly garbage collection to memory objects in at least one from among said generations, whilst running at least one program thread.

2. The method of claim 1, wherein said memory objects are associated with inter-generational values and identifier values and wherein said step (b) further includes manipulating inter-generational values and identifier values associated with said memory objects, whilst avoiding races.

3. The method of claim 2, wherein said step of manipulating includes synchronizing between said inter-generational values and identifier values associated with said memory objects.

4. The method of claim 2, wherein said inter-generational values and the identifier values, stipulated in said step (b), are stored in respective separate atomic write units.

5. A computer system that includes memory for performing garbage collection of memory objects in a memory heap, the heap or portion thereof is partitioned into at least two generations; the system comprising:

at least one program thread running in said computer system;

a garbage collector for applying substantially on-the-fly garbage collection to memory objects in at least one from among said generations, whilst running at least one of said program threads.

6. The system of claim 5, wherein said memory objects are associated with inter-generational values and identifier values and wherein said at least one program thread and garbage collector are capable of manipulating inter-generational values and identifier values associated with said memory objects whilst avoiding races.

7. The system of claim 5, wherein said inter-generational values and the identifier values are stored in respective separate atomic write units.

8. The system of claim 6, wherein said manipulating further includes utilizing a unique color identifier value for avoiding premature promotion of memory objects from a young generation to an older generation from among said at least two generations.

9. The system of claim 6, wherein said manipulating utilizes identifier toggling.

10. The system of claim 6, wherein said memory objects are further associated, each, with an age value indicative of the time duration that said object remains in a given generation; said manipulating further utilizing at least said age value as a criterion for promoting memory objects from said given generation to an older generation, from among said generations.

11. The system of claim 10, wherein said time duration is measured in number of collection cycles.

12. The system of claim 6, wherein said memory object is associated with two inter-generational values, said manipulation further including said two inter-generational values for avoiding weak consistency.

13. The system of claim 6, wherein said first identifier value, second identifier value and third identifier value correspond to a first color, second color and third color, respectively.

14. A computer system having a memory that includes data representative of memory objects in a memory heap; the memory heap or portion thereof is partitioned into at least two generations; the memory objects in at least one of said generations sustain after applying the garbage collection step according to claim 1.

* * * * *